United States Patent
Sawada (10) Patent No.: US 12,420,741 B2
(45) Date of Patent: Sep. 23, 2025

(54) VEHICLE, SECURITY CONTROL METHOD FOR VEHICLE, AND STORAGE MEDIUM STORING PROGRAM USED FOR SECURITY CONTROL FOR VEHICLE

(71) Applicant: TOYOTA JIDOSHA KABUSHIKI KAISHA, Toyota (JP)

(72) Inventor: Tomonari Sawada, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 81 days.

(21) Appl. No.: 18/501,100

(22) Filed: Nov. 3, 2023

(65) Prior Publication Data
US 2024/0149827 A1    May 9, 2024

(30) Foreign Application Priority Data

Nov. 8, 2022   (JP) ................. 2022-178931

(51) Int. Cl.
| | |
|---|---|
| *B60R 25/31* | (2013.01) |
| *B60R 25/104* | (2013.01) |
| *B60R 25/30* | (2013.01) |
| *B60R 25/10* | (2013.01) |

(52) U.S. Cl.
CPC .......... *B60R 25/104* (2013.01); *B60R 25/305* (2013.01); *B60R 25/31* (2013.01); *B60R 2025/1013* (2013.01)

(58) Field of Classification Search
CPC ..... B60R 25/104; B60R 25/305; B60R 25/31; B60R 2025/1013; B60R 16/02
See application file for complete search history.

(56) References Cited

U.S. PATENT DOCUMENTS

| | | | | |
|---|---|---|---|---|
| 8,310,353 | B2 * | 11/2012 | Hinninger | B60Q 9/008 |
| | | | | 340/438 |
| 9,421,902 | B2 * | 8/2016 | Kowatzki | B60Q 1/2696 |
| 9,751,458 | B1 * | 9/2017 | Dellock | B60Q 1/2696 |
| 11,472,332 | B1 | 10/2022 | Salter et al. | |
| 11,608,030 | B2 * | 3/2023 | Roberts | B60R 25/102 |

(Continued)

FOREIGN PATENT DOCUMENTS

| | | |
|---|---|---|
| DE | 102020104453 B3 | 5/2021 |
| DE | 102021101555 A1 | 7/2021 |

(Continued)

*Primary Examiner* — Nay Tun
(74) *Attorney, Agent, or Firm* — Dickinson Wright, PLLC (57) ABSTRACT

A security system includes a camera, an illuminator, and a controller. The controller determines whether a first condition is met. The first condition includes a requirement that a moving object has been detected within a first range while a vehicle is parked. The controller determines whether a second condition is met. The second condition includes a requirement that the moving object has been detected within a second range, which is narrower than the first range, while a vehicle is parked. The controller is configured to change one or more controls selected from a control of determining whether to perform recording with the camera, a control of turning on or off the illuminator, and a control of an illuminance of the illuminator, between a state in which the first condition is met but the second is not, and a state in which both the first and second conditions are met.

8 Claims, 4 Drawing Sheets

(56) References Cited

U.S. PATENT DOCUMENTS

| | | | |
|---|---|---|---|
| 2009/0243822 A1* | 10/2009 | Hinninger | B60Q 9/008 340/435 |
| 2012/0013485 A1* | 1/2012 | Pampus | B60W 50/14 340/932.2 |
| 2012/0191298 A1 | 7/2012 | Schwarzhaupt et al. | |
| 2013/0093583 A1* | 4/2013 | Shapiro | B60Q 9/005 348/148 |
| 2013/0342333 A1* | 12/2013 | Hutchings | G08B 13/19647 348/148 |
| 2014/0197968 A1* | 7/2014 | Mantie | G01S 15/931 340/932.2 |
| 2015/0348417 A1* | 12/2015 | Ignaczak | G08B 25/08 340/435 |
| 2015/0353000 A1* | 12/2015 | Kowatzki | B60Q 1/247 315/77 |
| 2017/0246985 A1* | 8/2017 | Dellock | B60Q 1/302 |
| 2018/0037193 A1* | 2/2018 | Penilla | G06Q 10/0833 |
| 2018/0272992 A1* | 9/2018 | Gage | G06V 20/56 |
| 2019/0308587 A1* | 10/2019 | Salter | E05F 15/73 |
| 2019/0315267 A1* | 10/2019 | Salter | B60Q 1/324 |
| 2020/0130750 A1* | 4/2020 | Glickman | E05F 15/50 |
| 2020/0284872 A1* | 9/2020 | Fix | B60W 50/14 |
| 2021/0229597 A1 | 7/2021 | Dellock et al. | |
| 2023/0097220 A1* | 3/2023 | Liu | G06V 40/161 713/186 |
| 2023/0336847 A1* | 10/2023 | Alakarhu | H04N 23/56 |

FOREIGN PATENT DOCUMENTS

| | | |
|---|---|---|
| DE | 102022124109 A1 | 3/2023 |
| JP | 2012-242992 A | 12/2012 |
| JP | 2013-504473 A | 2/2013 |

\* cited by examiner

VEHICLE, SECURITY CONTROL METHOD FOR VEHICLE, AND STORAGE MEDIUM STORING PROGRAM USED FOR SECURITY CONTROL FOR VEHICLE

BACKGROUND

1. Field

The present disclosure relates to a vehicle, a security control method for a vehicle, and a storage medium storing a program used for a security control for vehicle.

2. Description of Related Art

Japanese Laid-Open Patent Publication No. 2012-242992 discloses a security system that includes a camera, an illuminator, an illuminance sensor, and a controller. The camera captures images of surroundings of a vehicle. The illuminator illuminates the surroundings of the vehicle. The illuminance sensor detects brightness of the surroundings of the vehicle. When the brightness of the surroundings of the vehicle is less than a specified value, the controller executes a process of irradiating the surroundings of the vehicle with light with the illuminator and capturing images of the surroundings of the vehicle with the camera.

In a situation in which a person approaches a vehicle, there is a case in which a user of the vehicle approaches the vehicle in order to drive the vehicle, and there is a case in which a person simply passes by the vehicle. With such possible situations, it is not necessarily convenient for the vehicle user if the same process is executed regardless of the situation, as in the security system of Japanese Laid-Open Patent Publication No. 2012-242992.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a general aspect, a vehicle includes a sensor configured to detect an object within a specified range from the vehicle, a camera configured to capture images of outside of the vehicle, an illuminating unit configured to illuminate the outside of the vehicle, and processing circuitry configured to execute various processes of the vehicle. The processing circuitry includes a determining unit and a control unit. The determining unit is configured to determine, when the vehicle is in a stopped state, whether the object has been detected within a first range in the specified range by the sensor and whether the object has been detected within a second range by the sensor, the second range being different from the first range. The control unit is configured to control at least one of the camera and the illuminating unit based on whether the object has been detected within the first range or the second range.

In another general aspect, a security control method for a vehicle is provided. The vehicle includes a sensor configured to detect an object within a specified range from the vehicle, a camera configured to capture images of outside of the vehicle, and an illuminating unit configured to illuminate the outside of the vehicle. The security control method includes: determining, when the vehicle is in a stopped state, whether the object has been detected within a first range in the specified range by the sensor or whether the object has been detected within a second range by the sensor, the second range being different from the first range; and controlling at least one of the camera and the illuminating unit based on whether the object has been detected within the first range or the second range.

In a further general aspect, a storage medium storing a program used for a security control for a vehicle is provided. The vehicle includes a sensor configured to detect an object within a specified range from the vehicle, a camera configured to capture images of outside of the vehicle, an illuminating unit configured to illuminate the outside of the vehicle, and processing circuitry configured to execute various processes of the vehicle. The program is configured to cause the processing circuitry to determine, when the vehicle is in a stopped state, whether the object has been detected within a first range in the specified range by the sensor or whether the object has been detected within a second range by the sensor, the second range being different from the first range. The program is also configured to cause the processing circuitry to control at least one of the camera and the illuminating unit based on whether the object has been detected within the first range or the second range.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Schematic Configuration of Security System

An embodiment of the present disclosure will now be described with reference to FIGS. 1 to 4. First, a schematic configuration of a security system 100 will be described.

Figure 1:
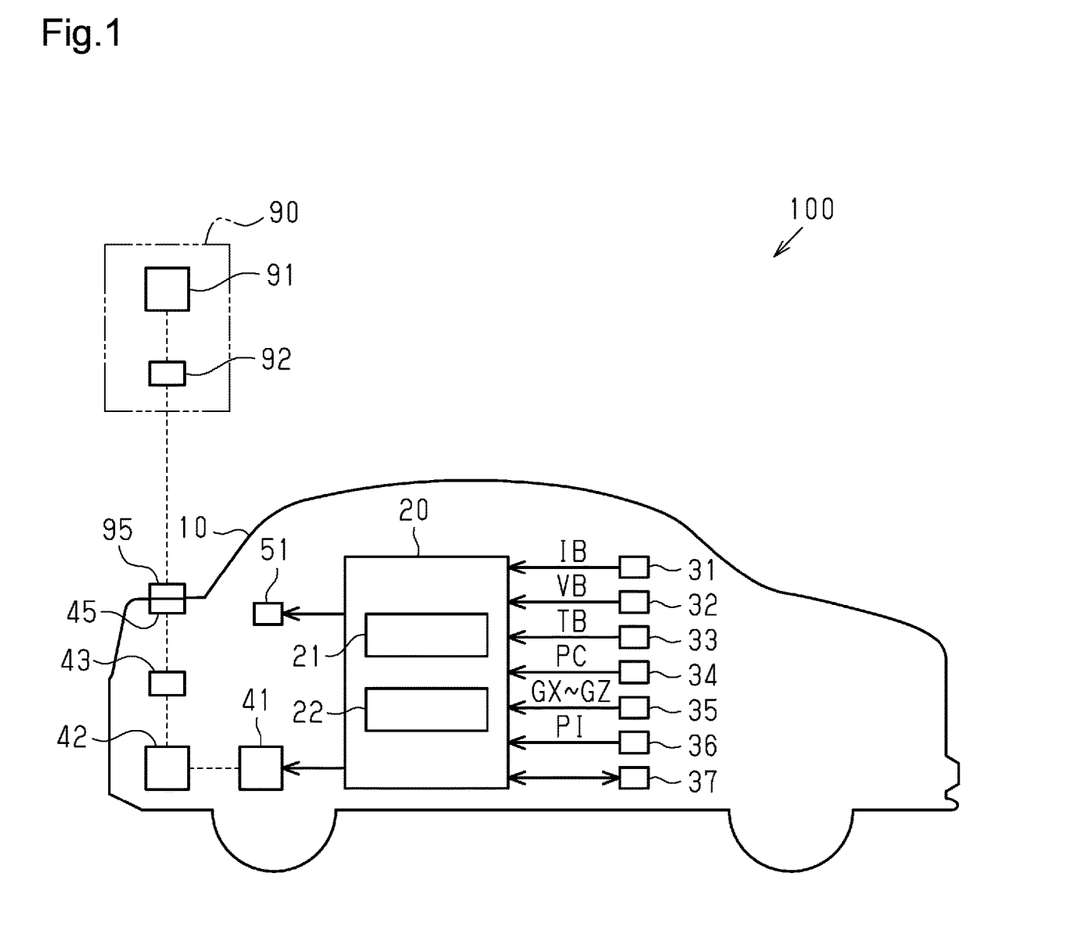
FIG. 1 is a schematic diagram illustrating a security system.

As shown in FIG. 1, the security system 100 includes a vehicle 10. The vehicle 10 is, for example, an automobile owned by a user. The vehicle 10 includes a motor-generator 41 and a battery 42. The battery 42 supplies power to various devices including the motor-generator 41. The battery 42 is a rechargeable battery. The motor-generator 41 is operated by the power supplied from the battery 42. The vehicle 10 is thus a battery electric vehicle.

The vehicle 10 includes a converter 43 and an inlet 45. The inlet 45 is connectable to an external power supply 90, which will be discussed below. The inlet 45 is electrically connected to the battery 42 via the converter 43. Power from the external power supply 90 is supplied to the inlet 45. The converter 43 converts AC power supplied from the inlet 45 into DC power. The converter 43 supplies the converted DC power to the battery 42. As a result, the battery 42 is charged by the external power supply 90. That is, the battery 42 can be charged by the external power supply 90 provided outside the vehicle 10.

The vehicle 10 includes a current sensor 31, a voltage sensor 32, a battery temperature sensor 33, and a global navigation satellite system (GNSS) receiver 34. The current sensor 31 detects a current IB input to and output from the battery 42. The voltage sensor 32 detects a voltage VB, which is the terminal-to-terminal voltage of the battery 42. The battery temperature sensor 33 detects a battery temperature TB, which is a temperature of the battery 42. The GNSS receiver 34 detects positional coordinates PC, which are the coordinates of the location where the vehicle 10 is situated, through communication with GNSS satellites (not shown).

The vehicle 10 also includes an acceleration sensor 35, cameras 36, a display 37, and an illuminator 51. The acceleration sensor 35 is a three-axis sensor. The acceleration sensor 35 is capable of detecting a longitudinal acceleration GX, a lateral acceleration GY, and a vertical acceleration GZ. The longitudinal acceleration GX is an acceleration along the longitudinal axis of the vehicle 10. The lateral acceleration GY is an acceleration along a lateral axis of the vehicle 10. The vertical acceleration GZ is an acceleration along a vertical axis of the vehicle 10.

Each camera 36 captures a video PI of surroundings of the vehicle 10. The cameras 36 capture images of different regions around the vehicle 10. The entire imaging region obtained by combining the imaging regions of the cameras 36 covers substantially the entire region in front of, behind, on the left side of, and on the right side of the vehicle 10. Each camera 36 also functions as a detector that detects a moving object around the vehicle 10. Each camera 36 operates based on power supplied from the battery 42. FIG. 1 shows only one of the cameras 36.

The display 37 displays various kinds of information. The display 37 is a touch screen. Therefore, the user can input various kinds of information via the display 37. The illuminator 51 emits light to the surroundings of the vehicle 10. The illuminator 51 is, for example, one or more selected from headlights, reversing lights, hazard warning lights, and daytime running lamps (DRL) included in the vehicle 10. The illuminator 51 operates based on power supplied from the battery 42.

The vehicle 10 includes a controller 20. The controller 20 obtains corresponding signals from the current sensor 31, the voltage sensor 32, the battery temperature sensor 33, and the GNSS receiver 34. In addition, the controller 20 obtains corresponding signals from the acceleration sensor 35, the cameras 36, and the display 37. The controller 20 displays various kinds of information on the display 37 by outputting control signals to the display 37. In addition, the controller 20 controls the illuminator 51 by outputting control signals to the illuminator 51. Further, the controller 20 outputs control signals to the cameras 36 to control the capturing of the videos PI with the cameras 36 and the recording of the captured videos PI.

The controller 20 includes an execution unit 21 and a storage unit 22. The storage unit 22 stores information and the like obtained by the controller 20. The storage unit 22 stores various programs in advance. Further, the storage unit 22 can store setting information IS. The setting information IS is any one of constant operation, area setting, and non-operation. The constant operation indicates the execution of a security control without any area restriction. The security control will be discussed below. The area setting indicates the execution of the security control at a specific position. In addition, the area setting includes information of coordinates of a position where the security control needs to be performed. The non-operation indicates the security control is not being executed in any area. The user can input the setting information IS by operating the display 37. The execution unit 21 executes various processes by reading programs in the storage unit 22. One example of the execution unit 21 is a CPU.

The execution unit 21 calculates the state of charge SOC of the battery 42 based on the current IB, the voltage VB, and the battery temperature TB at predetermined control intervals. The state of charge SOC is represented by the following expression (1).

State of charge SOC[%]=Remaining power of battery 42 [Ah]/Full charge capacity of battery 42 [Ah]×100[%]   Expression (1)

In the above expression (1), the full charge capacity is the maximum electric energy that can be stored in the battery 42. The full charge capacity slightly changes depending on the history of the voltage VB and the current IB of the battery 42 and the battery temperature TB. Therefore, the full charge capacity is calculated based on the history of the voltage VB and the current IB of the battery 42 and the battery temperature TB. The remaining power is calculated based on, for example, integrated values of the current IB and the voltage VB after the battery 42 is fully charged.

The execution unit 21 performs a monitoring control each time a predetermined specified condition is met. For example, when all of the following requirements (1) and (2) are satisfied, the execution unit 21 determines that the specified condition is met.

Requirement (1): The vehicle 10 is parked.

Requirement (2): At least one of the longitudinal acceleration GX, the lateral acceleration GY, and the vertical acceleration GZ is greater than or equal to a prescribed acceleration.

Therefore, for example, the execution unit 21 determines that the specified condition is met when a certain degree of impact is applied to the vehicle 10 in a state in which the vehicle 10 is parked. In the monitoring control, for example, the execution unit 21 activates the cameras 36 to capture the videos PI with the cameras 36 and stores the captured videos PI in the storage unit 22. In other words, the execution unit 21 performs recording with the cameras 36. The execution unit 21 ends the monitoring control when a predetermined period elapses after the specified condition is met.

As shown in FIG. 1, the security system 100 includes the external power supply 90. The external power supply 90 includes a power supply main body 91, a circuit breaker 92, and a connector 95. The connector 95 is connectable to the inlet 45 of the vehicle 10. The connector 95 is connected to the power supply main body 91 via the circuit breaker 92. The circuit breaker 92 is capable of interrupting the electrical connection between the connector 95 and the power supply main body 91. The power supply main body 91 can supply AC power.

Preliminary Determination Control

Next, a preliminary determination control performed by the controller 20 will be described with reference to FIG. 2. The controller 20 repeatedly performs the preliminary determination control when a preliminary determination condition is met. The preliminary determination condition is, for example, that the vehicle 10 is parked. In the preliminary determination control, the controller 20 sets ON/OFF of an execution flag F for performing a security control, which will be discussed below. In the present embodiment, the controller 20 sets the execution flag F to OFF at the point in time when the preliminary determination condition is met. That is, at the time when the first preliminary determination control is started, the execution flag F is OFF.

Figure 2:
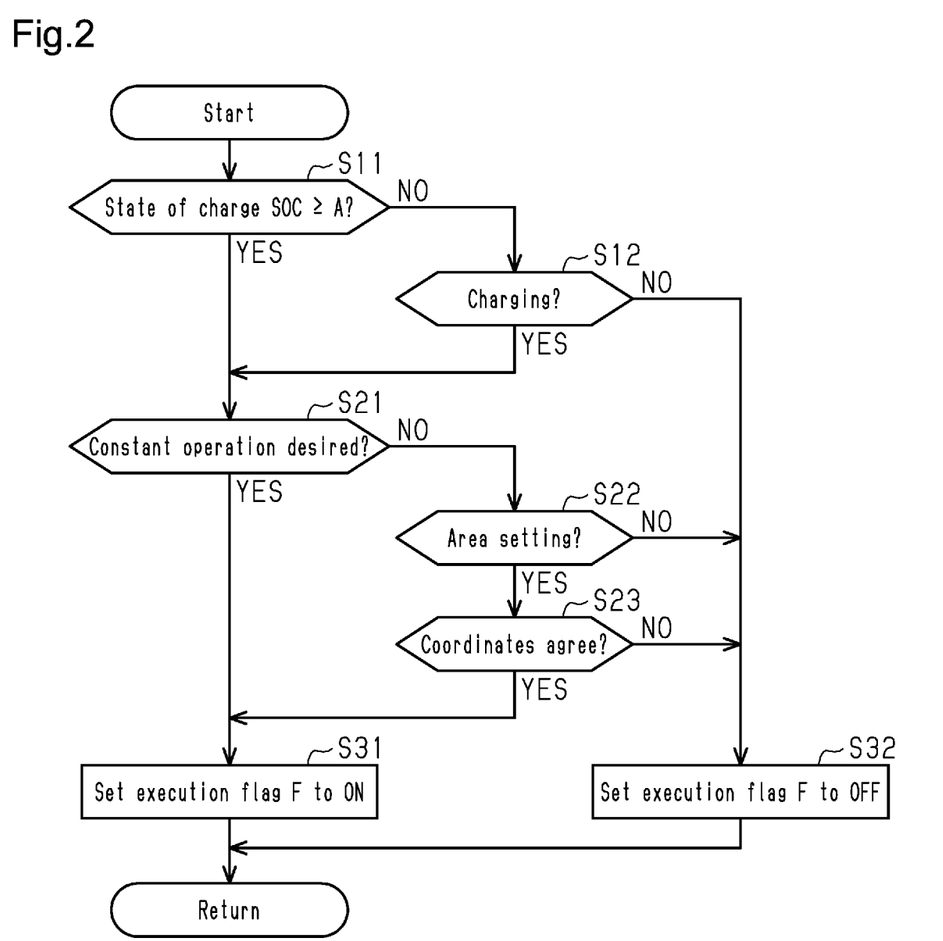
FIG. 2 is a flowchart showing a preliminary determination control.

As shown in FIG. 2, when the preliminary determination control is started, the controller 20 executes the process of step S11. In step S11, the controller 20 determines whether the state of charge SOC is greater than or equal to a prescribed state of charge SA. The prescribed state of charge SA is a threshold value for determining whether the state of charge SOC of the battery 42 is sufficient for performing the security control, which will be discussed below. One example of the prescribed state of charge SA is several tens of percent. When the state of charge SOC is greater than or equal to the prescribed state of charge SA (S11: YES), the controller 20 advances the process to step S21. When the state of charge SOC is less than the prescribed state of charge SA (S11: NO), the controller 20 advances the process to step S12.

In step S12, the controller 20 determines whether the battery 42 is being charged by the external power supply 90 at the time when the process of step S12 is executed. When the battery 42 is being charged by the external power supply 90 (S12: YES), the controller 20 advances the process to step S21.

In step S21, based on whether the setting information IS represents a constant operation, the controller 20 determines whether the constant operation is desired for the security control. When the constant operation of the security control is desired (S21: YES), the controller 20 advances the process to step S31. When the constant operation of the security control is not desired (S21: NO), the controller 20 advances the process to step S22.

In step S22, based on whether the setting information IS is set to the area setting, the controller 20 determines whether an area has been set in which the operation of the security control is desired. In a case in which the area in which the operation of the security control is desired is set (S22: YES), the controller 20 advances the process to step S23.

In step S23, the controller 20 determines whether the coordinates of a position at which the security control needs to be performed, which are included in the setting information IS, agree with the positional coordinates PC detected by the GNSS receiver 34. If the difference between the coordinates of the position at which the security control needs to be performed and the positional coordinates PC of the vehicle 10 is within a specified error range, the controller 20 determines that the coordinates agree. For example, the user can set the coordinates of a home parking lot or the like to the coordinates of the position where the security control needs to be performed. When the coordinates of the position where the security control needs to be performed agree with the positional coordinates PC of the vehicle 10 (S23: YES), the controller 20 advances the process to step S31.

In step S31, the controller 20 sets the execution flag F to ON. After step S31, the controller 20 ends the current preliminary determination control. Then, the controller 20 advances the process to step S11 again.

When the battery 42 is not being charged by the external power supply 90 (S12: NO), the controller 20 advances the process to step S32. In a case in which the area in which the operation of the security control is desired is not set (S22: NO), the controller 20 advances the process to step S32. In other words, when the setting information IS indicates the non-operation, the controller 20 advances the process to step S32. When the coordinates of the position where the security control needs to be performed do not agree with the positional coordinates PC of the vehicle 10 (S23: NO), the controller 20 advances the process to step S32.

In step S32, the controller 20 sets the execution flag F to OFF. After step S32, the controller 20 ends the current preliminary determination control. Then, the controller 20 advances the process to step S11 again.

Security Control

Next, the security control performed by the controller 20 will be described with reference to FIG. 3. The controller 20 repeatedly performs the security control on condition that the execution flag F is ON. The above-described preliminary determination control is performed on condition that the vehicle 10 is parked. When the preliminary determination control is performed, the execution flag F is set to ON. Accordingly, the security control is performed when the vehicle 10 is parked.

Figure 3:
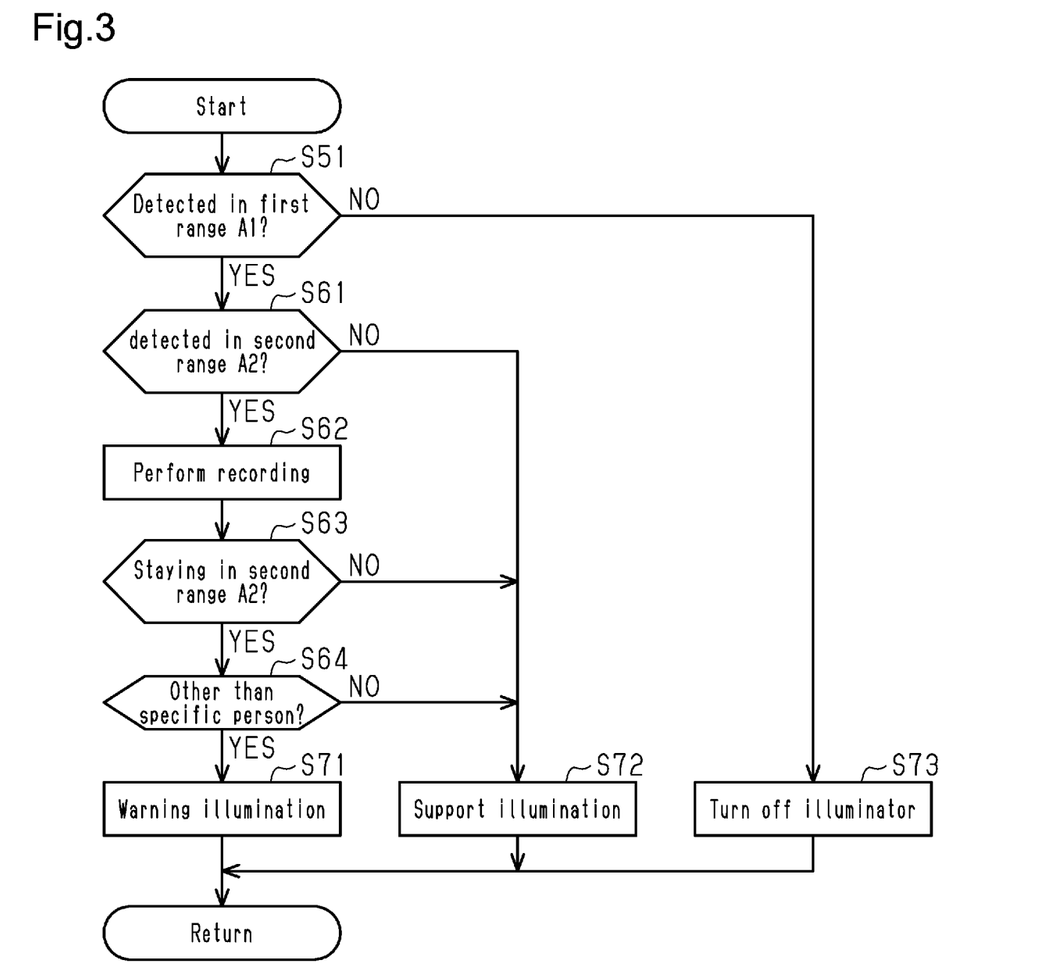
FIG. 3 is a flowchart showing a security control.

As shown in FIG. 3, when starting the security control, the controller 20 executes the process of step S51. In step S51, the controller 20, which is a determining unit, determines whether a moving object has been detected within a predetermined first range A1, which is a specified range, by any of the cameras 36. The first range A1 is a predetermined range that includes a position where the vehicle 10 is parked. For example, as indicated by the long-dash short-dash line in FIG. 4, the first range A1 is a range that includes the vehicle 10 and can be captured by any of the cameras 36. The first range A1 is determined in advance as, for example, a rectangular range having sides of several meters. As shown in FIG. 3, when a moving object is not detected within the first range A1 by any of the cameras 36 (S51: NO), the controller 20 advances the process to step S73.

As shown in FIG. 3, the controller 20, which is a control unit, turns off the illuminator 51, which is an illuminating unit, in step S73. As a result, illumination of the surroundings of vehicle 10 with light of the illuminator 51 is not performed. When the illuminator 51 is off at the time of step S73, the controller 20 continues the off state of the illuminator 51. In addition, the controller 20, which is a control unit, stops recording with the cameras 36. Similarly, when the recording with the cameras 36 has been stopped at the time of step S73, the controller 20 continues the stopped state of the recording with the cameras 36. After step S73, the controller 20 ends the current security control. Then, the controller 20 advances the process to step S51 again.

When a moving object is detected within the first range A1 by any of the cameras 36 (S51: YES), the controller 20 advances the process to step S61. In the present embodiment, a first condition is a requirement that an affirmative determination is made in step S51.

In step S61, the controller 20 determines whether a moving object has been detected within a predetermined second range A2, which is a specific range, by any of the cameras 36. The second range A2 is a predetermined range that is located in the first range A1 and narrower than the first range A1. For example, as indicated by the long-dash double-short-dash line in FIG. 4, the second range A2 is a rectangular range that includes the vehicle 10 and is smaller than the first range A1. The second range A2 is determined in advance as, for example, a rectangular range having sides several meters in length. In the present embodiment, each side of the second range A2 is located closer to the vehicle 10 than to the corresponding side of the first range A1. As shown in FIG. 3, when a moving object is detected within the second range A2 by any of the cameras 36 (S61: YES), the controller 20 advances the process to step S62. In the present embodiment, a second condition is a requirement that an affirmative determination is made in step S61.

In step S62, the controller 20 performs recording with the cameras 36. In other words, the execution unit 21 of the controller 20 stores the videos PI captured by the cameras 36 in the storage unit 22. After step S62, the controller 20 advances the process to step S63.

In step S63, the controller 20 determines whether the moving object is staying within the predetermined second range A2. Specifically, the controller 20 defines, as a continuous period TX, a period during which the affirmative determination is repeatedly made in step S61 until the time point at which step S63 is executed. The continuous period TX is a period during which a moving object is continuously detected by any of the cameras 36 in the second range A2. The controller 20 determines whether the continuous period TX is longer than or equal to a prescribed period TA. When the continuous period TX is longer than or equal to the prescribed period TA, the controller 20 determines that the moving object is staying in the second range A2. The prescribed period TA may be, for example, several tens of seconds to several minutes. The controller 20 resets the continuous period TX each time a negative determination is made in step S61. When a moving object is staying in the second range A2 (S63: YES), the controller 20 advances the process to step S64.

In step S64, the controller 20 determines whether the moving object is a person other than a predetermined specific person based on the videos PI captured by the cameras 36. Specifically, the controller 20 extracts a human face from images captured by the cameras 36. Then, the controller 20 compares feature points of the extracted face with predetermined feature points by a known method. The controller 20 determines that the moving object is the specific person when the comparison result is greater than or equal to a predetermined match rate. The controller 20 determines that the moving object is a person other than the specific person when the comparison result is less than the predetermined match rate. The specific person is, for example, the user of the vehicle 10. When the moving object is a person other than the predetermined specific person (S64: YES), the controller 20 advances the process to step S71. That is, the controller 20 advances the process to step S71 in a case in which the two requirements are satisfied: an affirmative determination in step S63 and an affirmative determination in step S64. In the present embodiment, a third condition is that two requirements, i.e., an affirmative determination in step S63 and an affirmative determination in step S64, are met.

In step S71, the controller 20 performs warning illumination by turning on the illuminator 51. Specifically, in the warning illumination, the controller 20 intermittently illuminates the surroundings of the vehicle 10 by controlling ON/OFF of the illuminator 51. In other words, the illuminator 51 flashes on and off. After step S71, the controller 20 ends the current security control. Then, the controller 20 advances the process to step S51 again.

When a moving object is not detected within the second range A2 by any of the cameras 36 (S61: NO), the controller 20 advances the process to step S72. When a negative determination is made in step S61, the controller 20 stops the recording with the cameras 36. When the moving object is not staying in the second range A2 (S63: NO), the controller 20 advances the process to step S72. Further, when the moving object is the predetermined specific person (S64: NO), the controller 20 advances the process to step S72.

In step S72, the controller 20 performs support illumination by turning on the illuminator 51. Specifically, in the support illumination, the controller 20 continuously illuminates the surroundings of the vehicle 10 by turning on the illuminator 51. In other words, the illuminator 51 is continuously illuminated. At this time, the controller 20 causes the illuminance of the illuminator 51 to be lower than the illuminance at the time when the illuminator 51 is turned on in the warning illumination of step S71. After step S72, the controller 20 ends the current security control. Then, the controller 20 advances the process to step S51 again.

Operation of Present Embodiment

Figure 4:
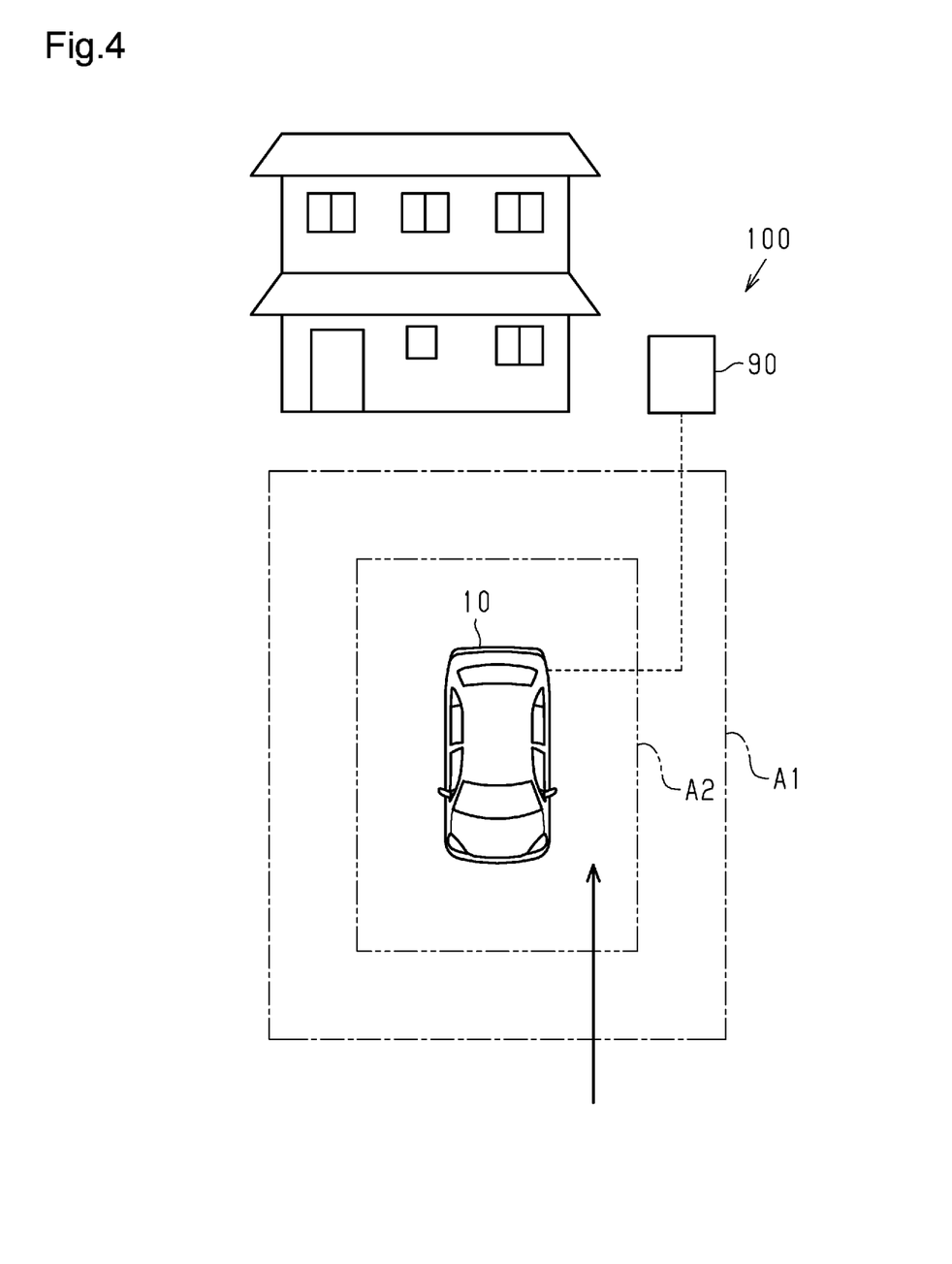
FIG. 4 is an explanatory diagram of operation of the security system.

A case will be discussed in which a person approaches the vehicle 10 as indicated by the solid arrow in FIG. 4. When the person enters the first range A1, the first condition is met. At this time, the controller 20 performs support illumination in step S72 as shown in FIG. 3. That is, the controller 20 continuously illuminates the surroundings of the vehicle 10 by turning on the illuminator 51. Accordingly, for example, at night, the surroundings of the vehicle 10 are illuminated, and the user or the like can easily recognize the surroundings of the vehicle 10.

When the person enters the second range A2, the second condition is met. At this time, the controller 20 performs recording with the cameras 36 in step S62 as shown in FIG. 3. Further, on condition that the second condition is met, when a person other than the user is staying within the second range A2, the controller 20 performs warning illumination. That is, the controller 20 intermittently illuminates the surroundings of the vehicle 10 by controlling ON/OFF of the illuminator 51.

In this manner, the controller 20 changes the control of determining whether to perform recording with the cameras 36, the control of turning on or off the illuminator 51, and the control of the illuminance of the illuminator 51, between a state in which the first condition is met but the second is not, and a state in which both the first and second conditions are met.

Advantages of Present Embodiment (1) As described above, recording with the cameras 36 is not performed in a state in which the first condition is met but the second condition is not met, whereas recording with the cameras 36 is performed in a state in which both the first condition and the second condition are met. Therefore, it is possible to perform recording with the cameras 36 in a situation in which attention is required to security of the vehicle 10, for example, due to a person approaching the vehicle 10.

Furthermore, the ON/OFF control of the illuminator 51 and the control of the illuminance of the illuminator 51 are changed between a state in which the first condition is met but the second condition is not met and a state in which both the first condition and the second condition are met. As described above, the control related to the cameras 36 and the control related to the illuminator 51 are changed in accordance with changes in the position of the moving object with respect to the vehicle 10. Therefore, in the present embodiment, the cameras 36 and the illuminator 51 can be controlled in a favorable manner in accordance with the position of the moving object with respect to the vehicle 10.

(2) In the preliminary determination control, the controller 20 sets the execution flag F to ON on condition that the battery 42 is being charged by the external power supply 90. Then, the controller 20 performs the security control on condition that the execution flag F is ON. In other words, the determination of whether the first condition and the second condition in the security control are met is performed on condition that the battery 42 is being charged by the external power supply 90. If the determination as to whether the first condition and the second condition are met is not performed, the subsequent recording with the cameras 36 and the continuous illumination or flashing on-and-off of the illuminator 51 are not performed. This prevents consumption of the electric power of the battery 42 due to the execution of the determination as to whether the first condition and the second condition in the security control are met.

(3) In terms of security of the vehicle 10, for example, the longer a person stays within the second range A2, the higher the possibility that the vehicle 10 will be harmed becomes. In this regard, the controller 20 executes the process of step S71 when the third condition is met, which includes the requirement that an affirmative determination is made in step S63, that is, the requirement that the continuous period TX is longer than or equal to the prescribed period TA. In step S71, the controller 20 intermittently illuminates the surroundings of the vehicle 10 by controlling ON/OFF of the illuminator 51. As a result, the illuminator 51 flashes on and off in situations that require more attention to the security of the vehicle 10, thereby calling attention to the surroundings of the vehicle 10

(4) For example, even when a person stays within the second range A2 for a relatively long period of time, if the person is the user of the vehicle 10, it is not necessary to call attention to the surroundings of the vehicle 10. In this regard, in the present embodiment, the third condition for performing the warning illumination includes the requirement that an affirmative determination is made in step S64, that is, the requirement that a moving object is a person other than the specific person determined in advance. For this reason, even when a person stays within the second range A2 for a long period of time, if that person is the user of the vehicle 10, the controller 20 executes the process of step S72, without executing the process of step S71. Thus, for example, when the user of the vehicle 10 is located within the second range A2, the illuminator 51 is not caused to flash on and off. This prevents the user of the vehicle 10 from feeling disturbed.

(5) In the present embodiment, when the setting information IS indicates the non-operation, the execution flag F is set to OFF. On the other hand, when the setting information IS is the constant operation or the area setting, the execution flag F may be turned ON. In this manner, since the user can select whether to perform the security control, it is possible to perform setting according to the user's preference.

(6) In the present embodiment, when the setting information IS is the area setting, the execution flag F may be turned ON only when the coordinates of the predetermined position at which the security control needs to be performed agree with the positional coordinates PC of the vehicle 10. Therefore, regarding whether to perform the security control, it is possible to make detailed settings based on the parking position of vehicle 10.

Modifications

The above-described embodiment may be modified as follows. The above-described embodiment and the following modifications can be combined as long as the combined modifications remain technically consistent with each other.

In the above-described embodiment, the preliminary determination control may be changed.

For example, the process of step S11 may be omitted. In this case, the controller 20 may execute the process of step S12 when starting the preliminary determination control.

For example, the process of step S12 may be omitted. In this case, when a negative determination is made in step S11, the controller 20 may advance the process to step S32.

For example, the process of step S23 may be changed. As a specific example, the area setting of the setting information IS may include information of coordinates of a position at which the security control is not performed. In this case, in step S23, the controller 20 may determine whether the coordinates of the position at which the security control is not performed agree with the positional coordinates PC of the vehicle 10. In this case, in step S23, when the coordinates of the position at which the security control is not performed agree with the positional coordinates PC of the vehicle 10, the controller 20 may advance the process to proceed to step S32.

For example, the processes of step S22 and step S23 may be omitted. In this case, when a negative determination is made in step S21, the controller 20 may advance the process to step S32.

For example, the processes of steps S21 to S23 may be omitted. In this case, when an affirmative determination is made in step S11 or step S12, the controller 20 may advance the process to step S31.

In the above-described embodiment, the security control may be changed.

For example, the process of step S62 may be changed. As a specific example, in step S62, the controller 20 may increase the illuminance of the illuminator 51 in addition to or instead of performing recording with the cameras 36. In other words, when both the first condition and the second condition are met, the controller 20 may increase the illuminance of the illuminator 51 as compared to when the first condition is met but the second condition is not met. As a result, the illuminance around the vehicle 10 is increased in situations that require attention to the security of the vehicle 10.

For example, the order of the processes of step S62 and step S63 may be changed. Specifically, the controller 20 advances the process to step S63 in a case in which an affirmative determination is made in step S61. When an affirmative determination is made in step S63, the controller 20 executes the process of step S62. In the above-described case, the second condition includes the requirement that an affirmative determination is made in step S61 and a requirement that an affirmative determination is made in step S63.

For example, the order of the processes of step S62, step S63, and step S64 may be changed. As a specific example, the controller 20 advances the process to step S63 in a case in which an affirmative determination is made in step S61. Also, the controller 20 advances the process to step S64 in a case in which an affirmative determination is made in step S63. When an affirmative determination is made in step S64, the controller 20 executes the process of step S62. In the above-described case, the second condition includes a requirement that an affirmative determination is made in step S61, a requirement that an affirmative determination is made in step S63, and a requirement that an affirmative determination is made in step S64.

For example, the process of step S64 may be omitted. In this case, the third condition is a requirement that an affirmative determination is made in step S63.

For example, the process of step S71 may be changed. As a specific example, in step S71, the controller 20 may continuously illuminate the illuminator 51 without causing the illuminator 51 to flash on and off. In addition, for example, the controller 20 may set the illuminance when the illuminator 51 is turned on to be the same as that in the process of step S72.

In the above-described embodiment, the monitoring control may be omitted.

In the above-described embodiment, the configuration of the security system 100 may be changed.

For example, the security system 100 may include a millimeter wave radar, a laser imaging detection and ranging (LIDAR) sensor, or the like as the detector. In this case, the cameras 36 do not necessarily need to function as detectors.

For example, the security system 100 may include a configuration other than the vehicle 10 and the external power supply 90. As a specific example, the security system 100 may include an illuminator 51 installed in the home or the like of the user of the vehicle 10. In this case, in step S71, step S72, and step S73, the controller 20 may control the illuminator 51 installed in the home or the like of the user of vehicle 10, in addition to or instead of the illuminator 51 installed in vehicle 10. The controller 20 can control the illuminator 51 installed in the home or the like of the user of vehicle 10 by communicating with a device outside the vehicle 10 using a communication device (not shown). As a specific example, the security system 100 may include an additional controller outside the vehicle 10, separately from the controller 20, and the additional controller performs the preliminary determination control and the security control. In this case, the controller 20 may transmit various types of information to the additional controller, which performs the preliminary determination control and the security control, by communicating with a device outside the vehicle 10 using a communication device (not shown).

The configuration of the controller 20 is not limited to the one described in the above-described embodiment. The controller 20 may be processing circuitry including one or more processors that execute various processes according to computer programs (software). The controller 20 may be processing circuitry that includes circuitry including one or more dedicated hardware circuits such as application specific integrated circuits (ASICs) that execute at least part of various processes, or a combination thereof. The processor includes a CPU and a memory such as a RAM and a ROM. The memory stores program code or instructions configured to cause the CPU to execute processes. The memory, which is a computer-readable medium, includes any type of media that are accessible by general-purpose computers and dedicated computers.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

The invention claimed is:

1. A vehicle, comprising:
   a sensor configured to detect an object within a specified range from the vehicle;
   a camera configured to capture images of outside of the vehicle;
   an illuminating unit configured to illuminate the outside of the vehicle; and
   processing circuitry configured to execute various processes of the vehicle,
   wherein the processing circuitry includes:
      a determining unit configured to determine, when the vehicle is in a stopped state, whether the object has been detected within a first range in the specified range by the sensor and whether the object has been detected within a second range by the sensor, the second range being different from the first range; and
      a control unit configured to control the camera or the illuminating unit based on whether the object has been detected within the first range or the second range;
   wherein
   the control unit is configured to intermittently illuminate surroundings of the vehicle by controlling ON/OFF of the illuminating unit when the object has been continuously detected within the second range for a specified time or longer, and
   the control unit is configured to continuously illuminate the surroundings of the vehicle by turning on the illuminating unit when the object is detected within the second range but has not been continuously detected for the specified time or longer.

2. The vehicle according to claim 1, wherein the control unit is configured to perform, based on whether the object has been detected within the first range or the second range, one or more of a control of determining whether to perform recording with the camera, a control of turning on or off the illuminating unit, and a control of an illuminance of the illuminating unit.

3. The vehicle according to claim 1, wherein
   the control unit is configured to turn on the illuminating unit and to control the camera not to perform recording when the object has been detected within the first range and has not been detected within the second range, and
   the control unit is configured to turn on the illuminating unit and to control the camera to perform recording when the object has been detected both within the first range and the second range.

4. The vehicle according to claim 1, wherein the control unit is configured to control, when the object has been detected both within the first range and the second range, the illuminating unit such that the illuminance of the illuminating unit is higher than when the object is detected within the first range and is not detected within the second range.

5. The vehicle according to claim 1, wherein
   the vehicle includes a battery that is chargeable by an external power supply, the camera and the illuminating unit operate based on power supply from the battery, and the control unit is configured to determine whether the object has been detected within the first range or the second range on condition that the battery has been charged by the external power supply.

6. The vehicle according to claim 1, wherein the control unit is configured to determine whether a predetermined specific person is detected within the second range based on a video captured by the camera, and control at least one of the camera and the illuminating unit based on whether it is determined that the specific person is detected within the second range.

7. A security control method for a vehicle, wherein the vehicle includes:
- a sensor configured to detect an object within a specified range from the vehicle;
- a camera configured to capture images of outside of the vehicle; and
- an illuminating unit configured to illuminate the outside of the vehicle, the security control method comprises:
- determining, when the vehicle is in a stopped state, whether the object has been detected within a first range in the specified range by the sensor or whether the object has been detected within a second range by the sensor, the second range being different from the first range;
- controlling at least one of the camera and the illuminating unit based on whether the object has been detected within the first range or the second range;
- intermittently illuminating surroundings of the vehicle by controlling ON/OFF of the illuminating unit when the object has been continuously detected within the second range for a specified time or longer, and
- continuously illuminating the surroundings of the vehicle by turning on the illuminating unit when the object is detected within the second range but has not been continuously detected for the specified time or longer.

8. A non-transitory computer readable storage medium storing a program used for a security control for a vehicle, wherein the vehicle includes:
- a sensor configured to detect an object within a specified range from the vehicle;
- a camera configured to capture images of outside of the vehicle;
- an illuminating unit configured to illuminate the outside of the vehicle; and
- processing circuitry configured to execute various processes of the vehicle, and the program is configured to cause the processing circuitry to
- determine, when the vehicle is in a stopped state, whether the object has been detected within a first range in the specified range by the sensor or whether the object has been detected within a second range by the sensor, the second range being different from the first range,
- control at least one of the camera and the illuminating unit based on whether the object has been detected within the first range or the second range;
- intermittently illuminate surroundings of the vehicle by controlling ON/OFF of the illuminating unit when the object has been continuously detected within the second range for a specified time or longer, and
- continuously illuminate the surroundings of the vehicle by turning on the illuminating unit when the object is detected within the second range but has not been continuously detected for the specified time or longer.

* * * * *